United States Patent Office 2,846,603
Patented Aug. 5, 1958

2,846,603

DYNAMO ELECTRIC MACHINES

Frank Alan Webster, London, and John Hewson, Stafford, England, assignors to The English Electric Company Limited, London, England, a British company Application April 23, 1956, Serial No. 580,030

Claims priority, application Great Britain May 3, 1955

2 Claims. (Cl. 310—258)

This invention relates to dynamo electric machines of the kind having a stator frame within which is mounted a laminated stator core, and a rotor, the size and nature of the machine being such that, in operation, cyclic distortion is set up in the stator core.

It is well known that in certain large machines, particularly two-pole turbo alternators, a cyclic distortion is set up in the stator core. This cyclic distortion results in objectionable vibrations in the stator frame which are transmitted to the machine foundations. It is an object of the present invention to provide an improved form of radially resilient mounting for the laminated stator core of such a machine.

According to the invention a dynamo electric machine has a stator frame including a plurality of axially spaced annular frame rings and a plurality of axially extending core support bars secured to the inner peripheries of the frame rings at circumferentially spaced positions, a laminated stator core mounted on the core support bars, and a rotor member, the size and nature of the machine being such that, in operation, cyclic distortion is set up in the stator core, each core support bar being slotted tangentially immediately in front of the points of attachment of the core support bars with the annular frame rings, so that the core support bars themselves provide radial resilience between the laminated stator core and the stator frame rings.

Figure 1:
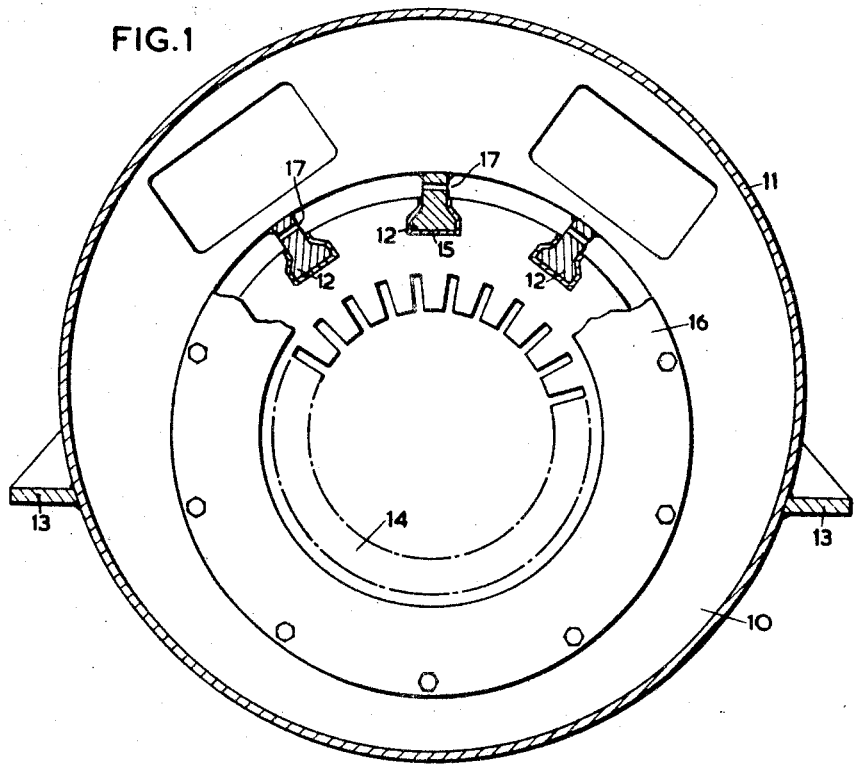
Figure 2:
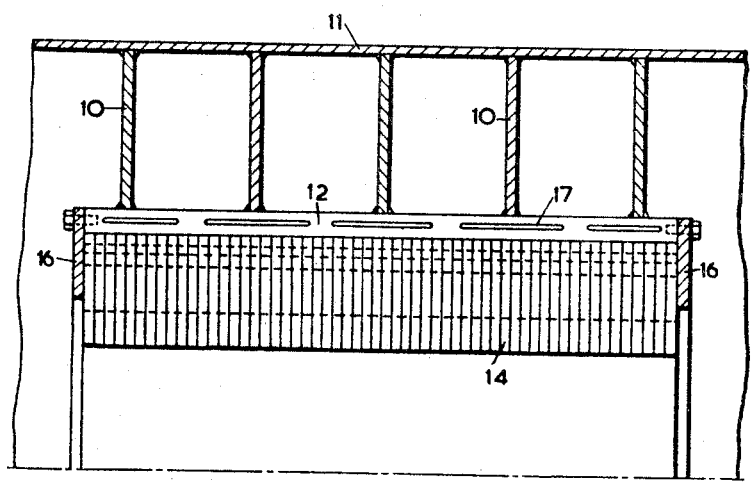

Further features of the invention will appear from the following description with reference to the accompanying drawings. Figs. 1 and 2 show respectively an end elevation and a part sectional side elevation of the relevant parts of a two-pole turbo-alternator embodying one arrangement according to the invention.

Referring now to Figs. 1 and 2, the stator frame shown therein is of fabricated construction and comprises a number of axially spaced frame rings 10, an outer wrapper plate 11, and a number of angularly spaced, axially extending, core support bars 12. The whole is welded together to form a rigid structure and feet 13 are welded thereto to provide a mounting for the machine.

The stator core 14 comprises a pack of laminations which, in this size of machine, will usually be of segmental form. The laminations are dovetailed on to the core support bars 12, a bakelised paper or paxolin liner 15 being inserted in the dovetails during assembly, and the assembled core is held in position by clamping rings 16 bolted to opposite ends of the core bars.

Radial resilience is provided between the stator core and the stator frame by forming tangential slots 17 in the core support bars directly below their points of attachment with the frame rings. This allows the parts of the core support bars between the slots and the points of attachment with the frame rings to bend slightly over the length of the slots and thereby take up distortion of the core.

For any given core support bar material, the degree of radial resilience obtained will depend upon the length of the slots, and the cross section of those parts of the core support bars which extend radially between the slots and the frame rings. It will therefore be appreciated that by adjustment of these various dimensions, different degrees of resilence may be obtained. If desired, the width of the core support bars may be such that a certain amount of resilience is also obtained circumferentially relative to the bore of the stator core.

It has been found that the greatest distortion of the stator core takes place intermediate its ends and, if desired, the slots at each end of the core bars may be omitted.

In the arrangements illustrated in the drawings the liners themselves provide a small amount of resilience though, if desired, they may be omitted altogether.

It will be appreciated that the dovetail slots may be formed in the core support bars instead of in the laminations.

What we claim as our invention and desire to secure by Letters Patent is:

1. A dynamo electric machine having a stator frame including a plurality of axially spaced annular frame rings and a plurality of axially extending core support bars secured to the inner peripheries of the frame rings at circumferentially spaced positions, a laminated stator core mounted on the core support bars, and a rotor member, the size and nature of the machine being such that, in operation, cyclic distortion is set up in the stator core, each core support bar being slotted tangentially immediately in front of the points of attachment of the core support bars with the annular frame rings, so that the core support bars themselves provide radial resilience between the laminated stator core and the stator frame rings.

2. A dynamo electric machine having a stator frame including a plurality of axially spaced annular frame rings and a plurality of axially extending core support bars secured to the inner peripheries of the frame rings at circumferentially spaced positions, a laminated stator core mounted on the core support bars, a dovetail key and slot connection between each supoprt bar and the laminated stator core, an insulating liner interposed between each dovetail key and slot, and a rotor member, the size and nature of the machine being such that, in operation, cyclic distortion is set up in the stator core, each core support bar being slotted tangentially immediately in front of the points of attachment of the core support bars with the annular frame rings, so that the core support bars themselves provide radial resilience between the laminated stator core and the stator frame rings.

References Cited in the file of this patent

UNITED STATES PATENTS

| | | |
|---|---|---|
| 2,199,141 | Rice | Apr. 30, 1940 |
| 2,342,502 | Taylor | Feb. 22, 1944 |
| 2,424,299 | Baudry et al. | July 22, 1947 |
| 2,720,600 | Pollard | Oct. 11, 1955 |